US011807996B2

(12) United States Patent
Sutherland et al.

(10) Patent No.: US 11,807,996 B2
(45) Date of Patent: Nov. 7, 2023

(54) RELOCATABLE TURF

(75) Inventors: Hamish Ross Sutherland, Romsey (AU); Matthew Alexander Woolfe, Croydon North (AU)

(73) Assignee: Technology Licensing Corporation, Cincinnati, OH (US)

(*) Notice: Subject to any disclaimer, the term of this patent is extended or adjusted under 35 U.S.C. 154(b) by 1950 days.

(21) Appl. No.: 14/119,378

(22) PCT Filed: Nov. 18, 2011
(Under 37 CFR 1.47)

(86) PCT No.: PCT/AU2011/001486
§ 371 (c)(1),
(2), (4) Date: May 20, 2014

(87) PCT Pub. No.: WO2012/159145
PCT Pub. Date: Nov. 29, 2012

(65) Prior Publication Data
US 2015/0033626 A1 Feb. 5, 2015

(30) Foreign Application Priority Data

May 23, 2011 (AU) .................. 2011901972

(51) Int. Cl.
*A01G 20/20* (2018.01)
*A01G 20/10* (2018.01)
(Continued)

(52) U.S. Cl.
CPC .......... *E01C 13/083* (2013.01); *A01G 20/00* (2018.02); *A01G 20/20* (2018.02); *E01C 2013/086* (2013.01)

(58) Field of Classification Search
CPC ........ A01G 1/005; A01G 1/002; A01G 20/00; A01G 20/10; A01G 20/12; A01G 20/18;
(Continued)

(56) References Cited

U.S. PATENT DOCUMENTS

| 5,205,068 A | 4/1993 | Solomou |
| 5,586,408 A * | 12/1996 | Bergevin ............... A63C 19/04 47/1.01 R |

(Continued)

FOREIGN PATENT DOCUMENTS

| GB | 2429171 | 2/2007 |
| JP | H0451823 | 2/1992 |

(Continued)

OTHER PUBLICATIONS

Australian Patent Office, International Search Report, dated Mar. 20, 2012, 5 pgs.

*Primary Examiner* — Son T Nguyen
(74) *Attorney, Agent, or Firm* — Wood Herron & Evans LLP

(57) ABSTRACT

A turf surface (80) comprising: (a) a reinforcing root-permeable mat (10); (b) a removable root-permeable backing (60) located beneath the reinforcing root-permeable mat (10); (c) a layer of growth media (42) located on the reinforcing root-permeable mat (10); and (d) natural grass plants (30) having roots (32) extending downwardly through the layer of growth media (42) and the reinforcing root-permeable mat (10) and the removable root-permeable backing (60); wherein, in use, prior to being laid at a destination site, the removable root-permeable backing (60) is separated from the reinforcing root-permeable mat (10), so that any roots (34) which engage with and extend through the removable root-permeable backing (60) are substantially removed from the turf surface (80).

7 Claims, 4 Drawing Sheets

(51) Int. Cl.
*E01C 13/08* (2006.01)
*A01G 20/00* (2018.01)

(58) Field of Classification Search
CPC ... A01G 20/20; E01C 2013/086; E01C 13/08; E01C 13/083
USPC ..................................................... 47/1.01 F
See application file for complete search history.

(56) References Cited

U.S. PATENT DOCUMENTS

| | | | | |
|---|---|---|---|---|
| 6,247,267 | B1* | 6/2001 | Motz | E01C 13/083 428/17 |
| 6,858,272 | B2* | 2/2005 | Squires | E01C 13/08 273/DIG. 13 |
| 2012/0167458 | A1* | 7/2012 | Agg | A01G 29/00 47/48.5 |

FOREIGN PATENT DOCUMENTS

| | | |
|---|---|---|
| JP | 2009165406 | 7/2009 |
| WO | 200105257 | 1/2001 |
| WO | 2006008579 | 1/2006 |

* cited by examiner

RELOCATABLE TURF

FIELD OF THE INVENTION

The invention relates to an improved turf surface, adapted to being relocated.

BACKGROUND OF THE INVENTION

In this specification, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

It is known that a variety of different turf surfaces can be used to provide a surface for landscaping, sports and other uses. These turf surfaces include purely natural grass, purely synthetic grass or a combination of both synthetic grass and natural grass ("combined turf").

Both combined turf surfaces and purely natural grass surfaces comprise natural grass plants. The presence of natural grass plants immediately creates a number of requirements with respect to the production (ie the natural grass plants have to be grown) and maintenance (ie the natural grass plants have to be maintained) of the turf surface. These requirements need to be taken into account when meeting the customer's requirements for its turf surface. In particular, many customers, especially sports stadiums and other public access sites (often large-scale sites), require a turf surface which can be used immediately upon installation and can withstand regular use.

Typically, during production, an initial "grow-in" stage is undertaken wherein the natural grass plants are grown at a "field site" before being relocated and installed at the "destination site" (the site of intended use). This enables the natural grass plants to develop sufficiently to allow the turf surface to be used immediately upon installation. Typically, a bulk density of 75 kg per m2 is ideal to enable the immediate play of sports such as Australian rules football, soccer and rugby. The natural grass plants are normally grown onto a reinforcing material which provides support to the natural grass plants, particularly during relocation. The reinforcing material also ensures the turf surface is installed level and tight, which is important if the turf surface is to be used immediately upon installation. The reinforcing material also provides ongoing stability benefits to the turf surface.

In addition, the turf surface must have good playing characteristics; in particular, the surface must not be too hard or too slippery. The turf must be strong to provide good playing characteristics and the key to a strong plant is a strong root system. A strong root system is a young vigorous root system; young roots absorb nutrients and water more rapidly than old roots, hence young roots are more efficient than old roots, and should be encouraged to ensure the turf surface has good playing characteristics. This is particularly important where relocatable turf is used as the turf surface. Relocatable turf has an existing root system, established at the field site, and when this turf is relocated to the destination site, it is important that the relocatable turf establishes a new root system to ensure the natural grass plants remain strong and provide good playing characteristics. Turf managers maintain the turf surface by mowing the natural grass plants, thinning the natural grass plants, supplying inputs to the natural grass plants (fertiliser, chemical, seed etc.), topdressing the surface with sand, aerating the surface and irrigating the surface (natural grass plants and sand). The irrigation is important not only for the plant but also for the sand as dry sand will have less cohesion and feel harder to players than moist sand.

In recent times, the use and layout of stadiums has changed and this has introduced new challenges in the maintenance of turf surfaces.

With respect to changed use, it is now more prevalent to use a stadium for a variety of different events which have different turf requirements leading to the movement of turf into and out of the stadium over a period of a few months. For example, in 2006 the Melbourne Cricket Ground (MCG) was used for the Commonwealth Games opening and closing ceremonies as well as the athletic events. The MCG normally hosts cricket and Australian rules football events with a full field of turf surface. The Commonwealth Games involved some turf being removed in late 2005 so that an athletics track could be laid and the turf being laid over the athletics track so that the annual Boxing Day (26 December) cricket could be played. The turf was then removed from over the athletics track and from within the athletics track for the opening ceremony and then re-laid within the athletics track after the opening ceremony and before athletics commenced for the Commonwealth Games, and then removed again from within the athletics track after the Commonwealth Games to allow for the removal of the athletics track and to allow for the reinstatement of the levels of the full field. Finally, the full field had to be reinstated in time for the ANZAC Day (25 April) football game. During this period, the turf was moved numerous times and laid over various bases, some less than ideal (eg athletics track), and the performance of the turf was therefore affected. In particular, the natural grass plants were not in optimum health because drainage was inconsistent over the different bases. In some situations, the turf was wilting, and in other situations, the turf was saturated. These differences presented challenges in the maintenance and preparation of the turf surface for the scheduled events, and ultimately the performance of the turf surface during the scheduled events.

With respect to changed stadium layouts, stadiums are now being designed and built for the benefit of spectators rather than for the benefit of natural grass plants, which leads to difficult growing conditions for natural grass plants, in particular, with limited sunlight and limited air movement. These difficult growing conditions have led to less healthy natural grass plants which are then subjected to further pressure when the turf surface is used for regular events, eg during the Australian rules football season. This has led to the need for frequent turf replacements increasing the cost of turf surface maintenance in such stadiums.

The problems with turf surface performance in these changed circumstances (both usage and layout) include:
the natural grass plants becoming weaker than desired, such that they do not have the necessary health strength to recover and the necessary health strength to persist as expected (durability);
the natural grass plants becoming more susceptible to disease;
the surface becoming more slippery to play on than desired as the weakened natural grass plant would lie over and fail to recover, creating more dead decomposing organic material on the turf surface, which contributed to the turf surface not drying out;
the weakened natural grass plants failing to benefit fully from inputs (eg fertiliser and chemical uptake) and commonly practiced turf maintenance techniques (eg top-dressing and aeration). Indeed, the commonly practiced turf maintenance techniques put further traffic on the already weakened plant thereby potentially causing more harm than good;

the irrigation system cannot be utilised to its full benefit as the surface is already wet. There is thus less opportunity (reluctance) to control moisture in the sand which influences the performance of the playing surface, if the sand is too dry then the surface will be too hard, hence the surface will be hard and slippery. There is also less opportunity (reluctance) to flush the turf profile (growth media in combined turf and beneath the combined turf) to dilute chemical build-up/concentrations; and the inconsistent moisture in the profile resulting from inconsistent drainage and inconsistent irrigation will undermine the development of the natural grass plant's root system which root system supports the health, resilience and durability of the natural grass plant. A wet surface and dry profile (growth media in the combined turf and beneath the combined turf) will cause a shallow root system to develop which is undesirable for performance of the turf surface.

There is thus a need for a turf surface which is better able to maintain its health, drainage, or performance characteristics in these more demanding/difficult conditions. It is further desirable to provide a commercially viable method for producing such an improved turf surface.

SUMMARY OF THE INVENTION

It has now been found that growing turf surfaces on a removable root-permeable backing provides a turf surface that exhibits superior properties of plant health, drainage, aeration and/or performance characteristics in the form of playability, strength and resilience and which is better suited to be relocated.

According to a first aspect of the invention, the present invention provides a mat for use in preparing a turf surface comprising natural grass plants, the mat comprising:
(a) a reinforcing root-permeable mat; and
(b) a removable root-permeable backing located beneath the reinforcing root-permeable mat.

According to a second aspect of the invention, the present invention provides a turf surface adapted to being relocated comprising:
(a) a reinforcing root-permeable mat;
(b) a removable root-permeable backing located beneath the reinforcing root-permeable mat;
(c) a layer of growth media located on the reinforcing root-permeable mat; and
(d) natural grass plants having roots extending downwardly through the layer of growth media, the reinforcing root-permeable mat and the removable root-permeable backing;
wherein, in use, prior to the turf surface being laid at a destination site, the removable root-permeable backing is separated from the turf surface; and wherein any roots of the natural grass plant which extend through and engage with the removable root-permeable backing are substantially removed from the underside of the turf surface.

According to a third aspect of the invention, there is provided a method for growing a turf surface adapted to be relocated, the method comprising the steps of:
(a) laying a subsurface, optionally, comprising a root-impermeable membrane;
(b) laying a removable root-permeable backing onto the subsurface;
(c) laying a reinforcing root-permeable mat onto the removable root-permeable backing;
(d) laying a layer of growth media onto the reinforcing root-permeable mat;
(e) growing natural grass plants in the layer of growth media, wherein one or more roots of the natural grass plants extend downwardly through the layer of growth media, the reinforcing root-permeable mat and engages with and extends through the removable root permeable backing.

According to a fourth aspect of the invention, there is provided a method for relocating turf surfaces comprising natural grass plants, the method comprising the steps of:
(a) removing a turf surface from an initial site, the turf surface comprising:
 (i) a reinforcing root-permeable mat;
 (ii) a removable root-permeable backing located beneath the reinforcing root-permeable mat;
 (iii) a layer of growth media located on the reinforcing root-permeable mat; and
 (iv) natural grass plants having roots extending downwardly through the layer of growth media, the reinforcing root-permeable mat and the removable root-permeable backing;
(b) separating the removable root-permeable backing from the turf surface so that any roots which engage with and extend through the removable root-permeable backing are substantially removed from the underside of the turf surface; and
(c) laying the resultant turf surface at a destination site.

According to a fifth aspect of the invention, the present invention provides a turf surface comprising:
(a) a surface adapted for supporting a turf surface;
(b) a reinforcing root-permeable mat;
(c) a layer of growth media located on the reinforcing root-permeable mat; and
(d) natural grass plants having roots extending: (i) downwardly through the layer of growth media and (ii) through the reinforcing root-permeable mat.

Without wishing to be bound by theory, it is thought that the removal of the roots with the removable backing leads to healthier plants as the layer of roots is not there to impair the development of new roots which are necessary to grow strong and healthy natural grass plants at the destination site. The key to a strong and healthy natural grass plant is a strong root system. Young roots absorb more nutrients and water than old roots making them more efficient. By removing the old roots (dead organic material) there will be less congestion in the growth media allowing more oxygen to enter the growth media to benefit the new roots (and allow carbon dioxide to exit the growth media). The removal of roots also improves drainage within the growth media and also from the turf surface. All are essential for the establishment of a strong root system, required to create natural grass plants which are healthier, stronger and more resilient to regular use. Healthier, stronger, and more resilient natural grass plants will withstand regular maintenance, which is fundamental to the preparation and performance of the turf surface. A well maintained turf surface will provide consistent playing characteristics i.e. less divotting and less slipping, which is desired by players.

Materials suitable for the removable root-permeable backing include both biodegradable and non-biodegradable materials and both woven and non-woven materials. Generally, any material will be acceptable provided that it can be constructed in a root-permeable configuration and it retains sufficient integrity at the end of the relevant period to effect the substantial removal of the natural grass roots that engage with and extend downwardly through it. Examples of materials that are suitable include, but are not limited to, polypropylene mesh, polypropylene fibres or yarns, polyethylene mesh, polyethylene fibres or yarns, polyester mesh, polyester fibres or yarns. Suitable products which are presently available on the market which may be used include geotextiles, shade cloth, erosion mats and fleece. As an example, the BIDIM™ A14 geotextile manufactured by Geofabrics Australia Pty Ltd can be used as a removable root-permeable backing.

The choice of material for making the removable root-permeable backing will depend on the needs of the particular user and the intended duration of the grow-in process. The material will not need to be as strong where longer grow-in periods are envisaged, as the roots become easier to remove over time due to declining root strength. Conversely, a stronger material will be necessary where a short grow-in period is envisaged as the roots are stronger. For example, a strong biodegradable material may be suitable for specific grow-in periods provided that the biodegradable material does not significantly degrade during the grow-in period. In some places, such biodegradable materials may be preferred as it is difficult to reuse the removable root-permeable backing.

Typically, the removable root-permeable backing is not secured to the reinforcing root-permeable mat by any means other than the natural grass roots of the turf surface once grow-in of the natural grass plants has occurred. However, in certain circumstances, the removable root-permeable backing may be removably attached to the reinforcing root-permeable mat so that the reinforcing root-permeable mat and the removable root-permeable backing can be easily laid from a single roll.

There are many known materials which may be used as the reinforcing root-permeable mat depending on the desired properties at the destination site. Transport and installation of the turf surface relies on the reinforcing root-permeable mat providing the necessary support through the processes to guarantee the integrity of each turf roll. Further, depending on the choice of reinforcing root-permeable mat, the turf surface of the invention can better accommodate standard turf management techniques, including solid or hollow-tine aeration and mechanical cleaning.

The reinforcing root-permeable mat may be composed of one or more root permeable materials. A person skilled in the art will understand that materials which are root permeable will also be water permeable. These materials include both biodegradable and non-biodegradable materials as well as combinations of both biodegradable and non-biodegradable materials. The biodegradable and non-biodegradable materials may be woven together into a single layer mat or the mat may comprise a layer of biodegradable material and a layer of non-biodegradable material.

In a preferred embodiment, the reinforcing root-permeable mat comprises at least one biodegradable material. In a more preferred embodiment, the reinforcing root-permeable mat comprises a layer of root permeable biodegradable material and a layer of a root permeable non-biodegradable material as described in Australian patent nos 738632 and 769873.

The reinforcing root-permeable mat may optionally include reinforcing fibres to provide added stability to the turf surface. Such a reinforcing root-permeable mat will result in a combined turf surface. The reinforcing root-permeable mat would typically include a plurality of substantially vertical reinforcing fibres. The reinforcing fibres may be selected from the group consisting of biodegradable synthetic grass fibres, non-biodegradable synthetic grass fibres, biodegradable non-synthetic grass fibres and mixtures thereof. Non-biodegradable synthetic grass fibres are preferably constructed from a substantially flexible material, for example, polyethylene, polypropylene, polyamides, polyolefins or mixtures thereof. Biodegradable synthetic grass fibres are preferably constructed from a substantially flexible bioplastic material, for example, polylactic acid, polyhydroxyaalkanoate, bioethylene or mixtures thereof. Biodegradable non-synthetic fibres are preferably constructed from a substantially flexible material, for example protein fibres such as wool or silk, cellulose fibres such as rayon, baststem fibre such as kenaf, flax, hemp or ramie, seed hair fibre such as coir, cotton or kapok, leaf fibre such as sisal, or mixtures thereof. However, any material commonly used in the art for making reinforcing fibres may be used. The reinforcing fibres may be monofilaments and/or may be fibrillated.

The length of the reinforcing fibres may differ depending on the intended use of the turf surface. For example shorter reinforcing fibres can be used so that the reinforcing fibres remain completely within the layer of growth media. Alternatively, longer reinforcing fibres can be used that extend above the layer of growth media to support the leaf blades of the natural grass plants, thereby increasing the playing hours of the natural grass plants.

Those skilled in the art will appreciate that there are a variety of ways for positioning the reinforcing fibres and retaining them in position. The reinforcing fibres are preferably secured to one or more of the backing materials by tufting alone. However, they may be secured by any means suited for constructing reinforcing root-permeable mats, for example being knitted or woven to one or more of the backing materials. The reinforcing fibres can be arranged in any configuration and the configuration of the reinforcing fibres will differ according to the intended uses and applications and the desired playing characteristics of the turf surface. For example, the reinforcing fibres may be arranged closely together in rows across the backing. Other configurations which can also be adopted include the configurations disclosed in U.S. Pat. No. 6,242,062 and WO 2004/057111. Many other configurations are possible and the invention is not limited in this respect.

The layer of growth media can be any suitable media for growing natural grass plants. Examples of suitable growth media include natural sand and soil, synthetic media (such as polymers, including crumb rubber), and organic media (such as coconut fibre or cork).

The removable root-permeable backing is laid on the subsurface of the field site or, where the turf surface may need to be relocated again, at the destination site. The subsurface is typically the subsoil present at the site and is laser levelled and consolidated. The subsurface may optionally comprise a root-impermeable membrane and/or a lower layer of growth media. The optional root-impermeable membrane ensures that the natural grass roots do not extend down into the subsurface of the field site and anchor, thereby impeding the uplifting process when relocating the turf. The subsurface of the field site may in some cases be sufficiently compacted so that root penetration into the subsurface is prevented, rendering the root-impermeable membrane unnecessary. The optional layer of growth media may be the same as or similar to the growth media located on the reinforcing root-permeable mat.

EXAMPLES

Various aspects of the invention will now be described with reference to the following non-limiting examples.

Example 1

Grow-in at Field Site

The subsurface at the field site is laser levelled and consolidated, and is first covered with an impermeable root membrane, being a plastic sheet or similar and then covered with a removable backing, being a geo-textile or similar, which is root permeable.

A reinforcing root-permeable mat is placed upon the removable backing. The reinforcing root-permeable mat comprising a plurality of synthetic grass fibres constructed of 100% polypropylene fibres (888 Tex twisted linear density) with 38.10 mm fibre height, tufted in a straight pattern on a 28.57 mm gauge with 165 stitches per m, into a layer of biodegradable 6.0 oz hessian woven material and into a layer of non-biodegradable 40% shade polypropylene woven material.

The reinforcing root-permeable mat is rolled onto the removable backing, and adjacent rolls are abutted and the seams are sewn together to create a continuous, seamless "carpet" across the designated field site. The vertically tufted synthetic grass fibres are filled to approximately 66% of their height (i.e. slightly more than 25 mm) with sand used to create the surrounding layer of growth media. The sand is applied in dressings and broomed into the mat to ensure the synthetic grass fibres remain upright. The sand, materials for the reinforcing root-permeable mat and the synthetic grass fibres are all selected so that the resultant turf surface is free draining.

After all the sand has been applied, nutrients are applied to the sand and then the sand is planted with natural grass, either in seed form, sprig form or turf form. The grow-in process begins immediately following completion of the planting process and is expected to last about eight weeks and possibly longer. During the grow-in process, the natural grass roots extend downwardly through the layer of growth media and reinforcing root-permeable mat, and further extend through and engage with the removable root-permeable backing, balling on the underside of the removable root-permeable backing.

When the turf surface is harvested from the field site, the removable root-permeable backing and any natural grass roots that have engaged with and extended through it are substantially removed from the turf surface before transportation and installation of the turf surface at the destination site. This removal stimulates the growth of new natural grass roots into the subsurface at the destination site, which are required to provide a healthy, resilient and durable natural grass plant. The turf surface also exhibits improved properties of plant health, drainage and aeration characteristics and improved plant performance characteristics in the form of playability, strength and resilience.

Removing the old natural grass roots from beneath the reinforcing root-permeable mat produces a turf surface that is free of unwanted and detrimental root growth (dead organic material) that would otherwise stymie plant performance by adversely affecting aeration and drainage within the growth media. These adverse effects will impede the development of new natural grass roots which are essential for the natural grass plants' ability to recover after use, for the natural grass plants' durability and for the natural grass plants' resilience to disease. Further, performance of the playing surface will also be affected as plant degradation will contribute to an unstable playing surface. It is acknowledged in the industry that poor drainage will contribute to plant degradation, especially when under use as degradation is accelerated.

Example 2

Relocation from the Destination Site

A turf surface is prepared and harvested at a field site as per Example 1.

The subsurface of the destination site is consolidated and depending on the compaction of the subsurface a root impermeable backing may be laid. On top of the subsurface and optional root impermeable backing, a removable root-permeable backing is laid.

Following installation of the turf surface at the destination site, the natural grass roots of the turf surface extend downwardly through the layer of growth media and reinforcing root-permeable mat, and further extend through and engage with the removable root-permeable backing. When the turf surface needs to be removed from the destination site, the natural grass roots that have engaged with and extended through the removable root-permeable backing at the destination site can again be substantially removed by removing the root-permeable backing from the turf surface. This produces a turf surface that will continue to exhibit improved properties of plant health, drainage and aeration characteristics and improved plant performance characteristics in the form of playability, strength and resilience, when subsequently relocated to other destination sites.

Example 3

This example reports the results of a trial demonstrating the advantages of a turf surface produced using the removable root-permeable backing according to the invention.

A turf surface was prepared as per Example 1 wherein the removable root-permeable backing used was 'Bidim A14'. Once the roots extended down through the layer of growth media (sand) and down through the reinforcing root-permeable mat, extra inputs (ie fertiliser and irrigation) were required to be applied to the natural grass plants and the plants were then able to force their roots through the removable root-permeable backing. Other than these additional inputs, maintenance at the field site proceeded as per normal with the natural grass plants growing as they did in the prior art methods.

After about 3 months, the natural grass plants in the turf surface were sufficiently mature to be harvested, transported and installed at the destination site. During harvesting the removable root-permeable backing required considerable force to be removed from the underside of the turf surface roll as the roots held the removable root-permeable backing tight against the underside of the turf surface, but the strength of the removable root-permeable backing was sufficient to withstand the force required to remove it, leaving a clean base on the underside of the turf surface roll.

During transport and installation, extra care was taken to ensure the natural grass plants were not stressed which was possible after the roots had been severed from the underside of the turf surface roll. After harvest, the natural grass plants can only live in the upper layer of growth media until the turf surface is installed at the destination site and new roots have been established at the destination site.

Since the trial turf surface was installed at the destination site, its performance has been monitored. The trial turf surface has more extensive and more substantial new root development compared to the turf surface that is produced without using the removable root-permeable backing of the invention. The removal of the old roots has stimulated the development of new roots, and these new roots have advanced within a better growth media. The growth media has not held moisture and the playing surface has not been slippery as was the case with prior turf installations, suggesting that drainage of the growth media has improved with use of the removable root-permeable backing of the invention. The advancement of the new natural grass roots also suggests that the aeration in the growth media has improved compared to prior turf installations. The health and strength of the natural grass plants are also improved with less disease being reported when compared with the natural grass plants from prior turf installations. Further, the performance of the turf surface when played upon has improved with less divots and less slipping being reported, and better recovery of the natural grass plants between events. However, the trial turf surface has required more inputs (fertiliser and chemicals) being applied while the new root system developed.

In addition, when the removable root-permeable backing was removed from the underside of the turf surface at a later point in time to that of the trial, it was observed that less force was required for the removal. Whilst not wishing to be bound by theory, it is thought that this may be because the roots are older and less healthy.

BRIEF DESCRIPTION OF THE DRAWINGS

Preferred embodiments of the present invention will now be described with reference to the accompanying drawings. These embodiments are given by way of illustration only and other embodiments of the invention are possible. Consequently, the particularity of the accompanying drawings are not to be understood as superseding the generality of the preceding description. In the drawings.

DETAILED DESCRIPTION OF THE DRAWINGS

Prior Art Surface Grown at the Destination Site (ie not Relocated)

Figure 1:
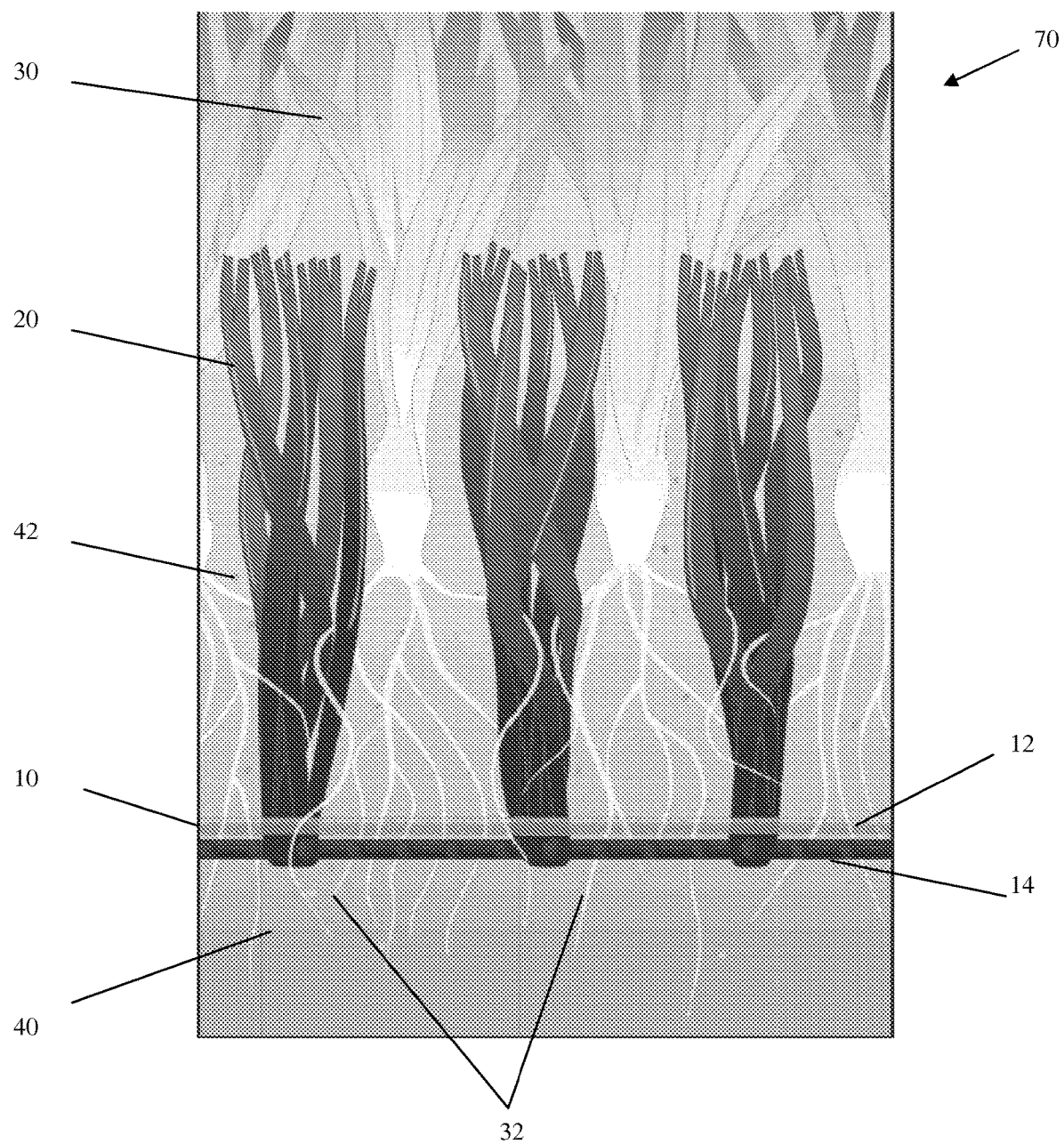
FIG. 1 is a side view drawing of a turf surface featuring natural grass plants prepared according to the conventional method and installed at a destination site.

FIG. 1 shows a turf surface 70 featuring natural grass plants 30 prepared according to the conventional method grown at a destination site (and not relocated). In this figure, the reinforcing root-permeable mat 10 comprises a layer of biodegradable material 12 and a layer of non-biodegradable material 14 to which is secured a plurality of synthetic reinforcing fibres 20. However, it should be understood that the reinforcing root-permeable mat 10 could be made of one layer alone and that it is not necessary to include both layers of a biodegradable material 12 and a non-biodegradable material 14. The synthetic reinforcing fibres 20 are preferably tufted to the reinforcing root-permeable mat 10, however other means of securing are possible such as being knitted or woven to one or more of the layers 12 or 14.

The reinforcing root-permeable mat 10 is positioned horizontally on the subsurface 40 of the destination site, which is preferably laser levelled and consolidated prior to installation of the turf surface. A layer of growth media 42 is placed on the reinforcing root-permeable mat 10, surrounding the synthetic reinforcing fibres 20 but leaving 33% or thereabouts of the tips of the synthetic reinforcing fibres exposed. The layer of growth media 42 can be any suitable growth media, such as sand. The natural grass plants 30 are situated in the layer of growth media 42 having roots 32 that extend downwardly through the layer of growth media 42 and the reinforcing root-permeable mat 10. The roots 32 of the natural grass plants 30 penetrate deeply into the subsurface 40 because the product is grown at its final destination rather than at a field site for subsequent relocation.

Relocatable Turf Surface According to the Invention

Figure 2:
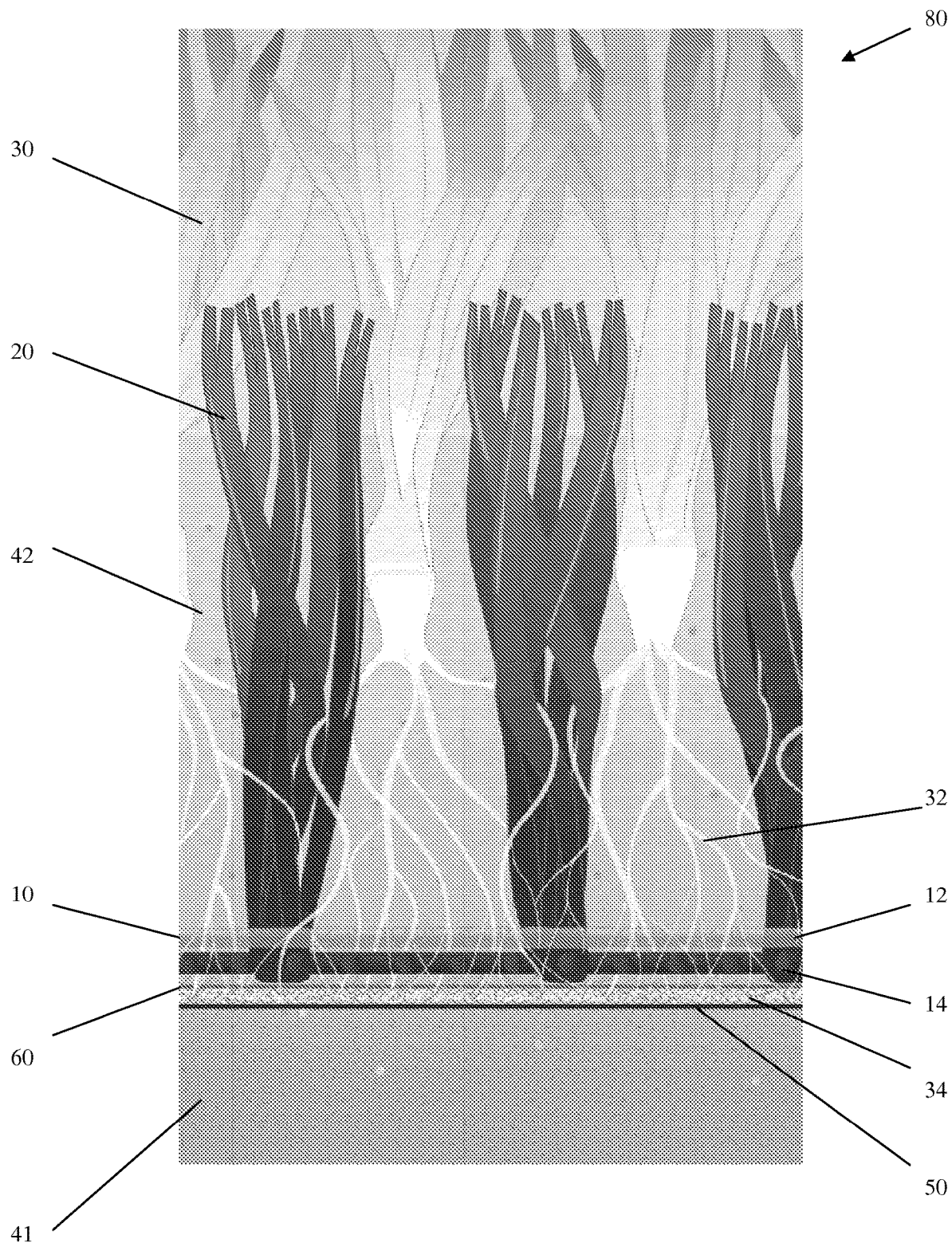
FIG. 2 is a side view drawing of a turf surface featuring natural grass plants prepared at a field site according to the method of the present invention.

FIG. 2 shows a turf surface 80 prepared at a field site according to the method of the present invention. The reinforcing root-permeable mat 10 in this figure is identical to that described in FIG. 1, comprising a layer of biodegradable material 12 and a layer of non-biodegradable material 14 and having a plurality of synthetic reinforcing fibres 20 secured to it. A root-impermeable membrane 50 prevents the penetration of any of the roots 32 of the natural grass plants 30 into the subsurface 41 of the field site. This root-impermeable membrane 50 is optional as the subsurface 41 of the field site may be sufficiently compacted so that the natural grass roots 32 do not penetrate it sufficiently to significantly hinder harvesting of the turf surface from the field site.

A removable root-permeable backing 60 separates the reinforcing root-permeable mat 10 and the root-impermeable membrane 50 so that the natural grass roots 32 extend downwardly through and engage with the removable root-permeable backing 60 before reaching the root-impermeable membrane 50. The natural grass roots 32 that penetrate the removable root-permeable backing 60 accumulate and form a layer 34 on the underside of the removable root-permeable backing 60.

Figure 3:
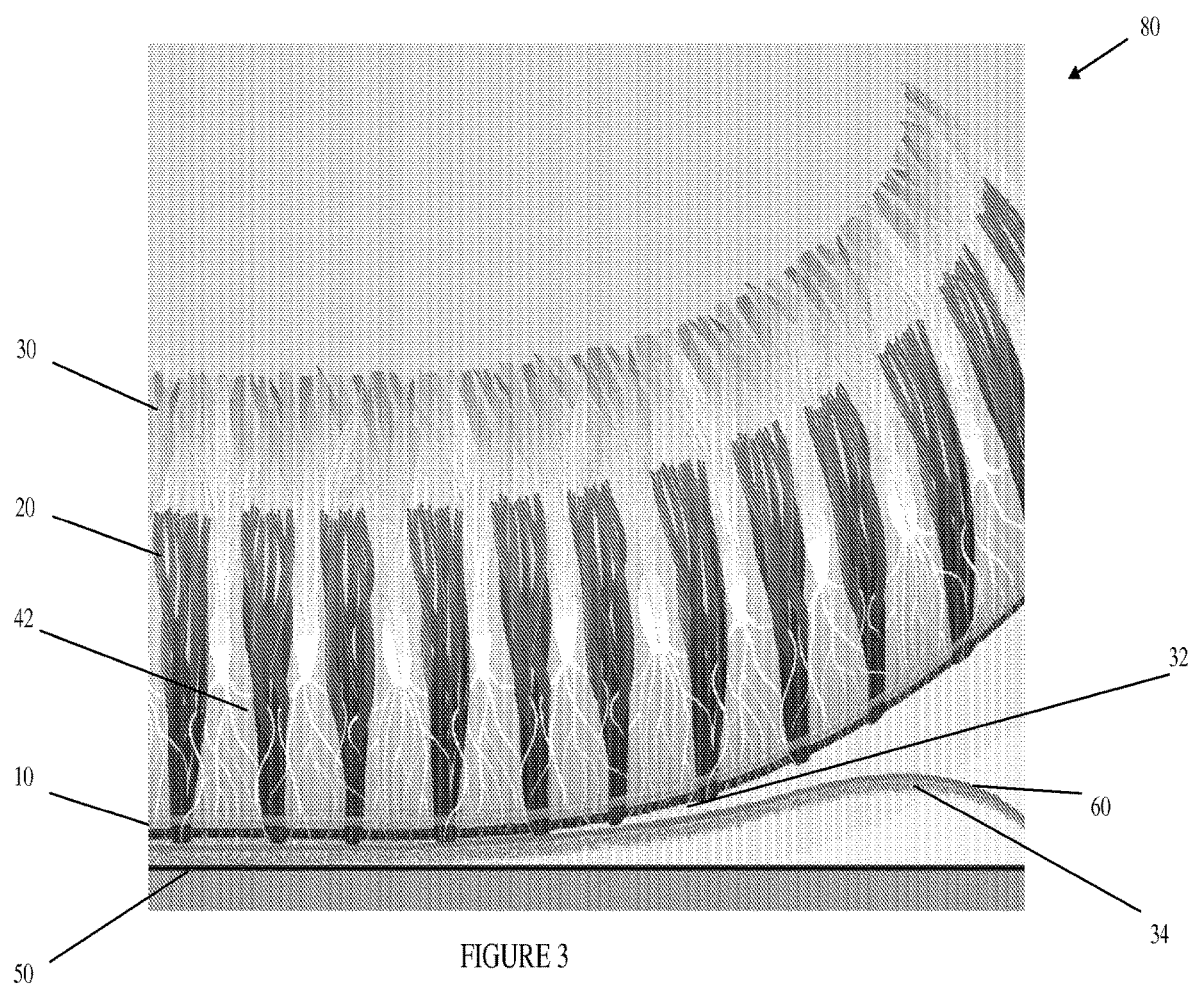
FIG. 3 is a side view drawing of a turf surface of the present invention being removed from a field site.

FIG. 3 shows the turf surface 80 of FIG. 2 being harvested. Harvesting of the turf surface 80 typically involves pre-cutting the turf surface 80, preferably through the reinforcing root-permeable mat 10, removable root-permeable backing 60 and root-impermeable membrane 50 into predetermined widths and lengths before rolling with harvest equipment (not shown). Alternatively, if no harvest equipment is available, widths and lengths of the turf surface 80 can be rolled by hand. The turf surface 80 is uplifted from the root impermeable membrane 50 together with the removable root-permeable backing 60, which is attached to the reinforcing root-permeable mat 10 by the natural grass roots 32 that have engaged with and extend downwardly through the removable root-permeable backing 60.

The removable root-permeable backing 60 is removed from the turf surface 80, preferably as the turf surface 80 is being uplifted. This removes any natural grass roots 34 that have engaged with and extended downwardly through the removable root-permeable backing 60 from the underside of the reinforcing root-permeable mat 10. The turf surface 80, comprising the reinforcing root-permeable mat 10, synthetic reinforcing fibres 20, growth media 42 and natural grass plants 30, is then rolled into rolls, or packed together as slabs, and transported to the destination site for installation. Alternatively, the removable root-permeable backing 60 may remain attached to the root-permeable mat 10 during uplifting from the field site and transportation to the destination site, being removed from the turf surface only immediately prior to installation at the destination site.

Figure 4:
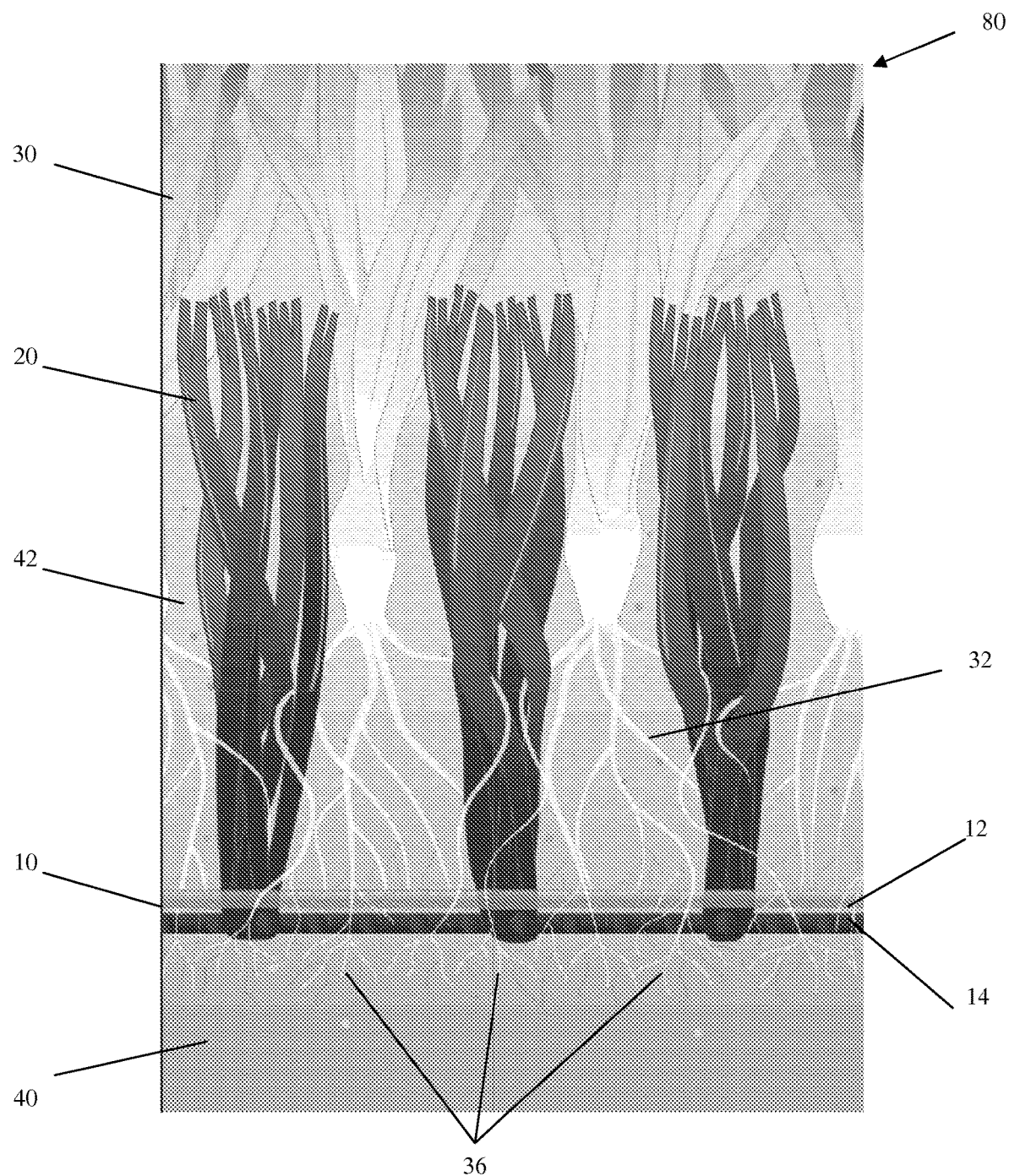
FIG. 4 is a side view drawing of a turf surface of the present invention from as early as 2 days following installation at a destination site.

FIG. 4 shows the turf surface 80 of FIG. 3 from as early as 2 days following installation at a destination site. The natural grass plants 30 have been stimulated to grow new roots 36 into the subsurface 40 of the destination site because the old roots have been removed. Young roots absorb nutrients more rapidly than old roots, anything that stimulates new root growth will in turn increase the efficiency of the plant. This allows a stronger, more extensive root system to rapidly develop into the subsurface 40 so that the natural grass plants have a root system similar to that of natural grass plants grown on site (see FIG. 1). This improves the ability of the natural grass plants 30 to absorb nutrients and moisture from the subsurface 40 and resulting in improved performance characteristics of strength, health and durability of the natural grass plants 30. In addition, the natural grass plants 30 are less likely to experience problems such as stunted growth and limited oxygen exchange. Additionally, the turf surface 80 exhibits an immediate improvement in drainage and aeration characteristics.

The word 'comprising' and forms of the word 'comprising' as used in this description and in the claims does not limit the invention claimed to exclude any variants or additions.

Modifications and improvements to the invention will be readily apparent to those skilled in the art. Such modifications and improvements are intended to be within the scope of this invention.

The invention claimed is:

1. A relocated turf surface installed at a destination site, within two days of the relocating, and suitable for use as an athletic playing surface, comprising:
    a reinforcing root permeable mat that is sufficiently strong to have supported the turf surface during the relocating and also sufficiently strong to support the turf surface during subsequent use as an athletic playing surface at the destination site, the reinforcing root permeable mat including a plurality of substantially vertical reinforcing fibres;
    a layer of growth media located on the reinforcing root permeable mat; and
    natural grass plants having roots extending downwardly through the layer of growth media and the reinforcing root permeable mat, wherein the natural grass plants include newly grown roots at a bottom thereof, the newly grown roots having been generated because of the prior removal during harvesting of a root layer that had existed when the turf surface was previously located and created at a grow in site.

2. The turf surface of claim 1, wherein the reinforcing root-permeable mat comprises a plurality of substantially vertical reinforcing fibres selected from the group consisting of biodegradable synthetic grass fibres, non-biodegradable synthetic grass fibres, biodegradable non-synthetic grass fibres and mixtures thereof.

3. The turf surface of claim 1, wherein the reinforcing fibres are selected from the group consisting of:
    (a) non-biodegradable synthetic grass fibres made of polyethylene, polypropylene, polyamides, polyolefins and mixtures thereof;
    (b) biodegradable synthetic grass fibres made of polylactic acid, potyhydroxyaalkanoate, bioethylene and mixtures thereof;
    (c) biodegradable non-synthetic grass fibres made of wool, silk, rayon, kenaf, flax, hemp, ramie, coir, cotton, kapok, sisal and mixtures thereof; and
    (d) a mixture of one or more of the materials in (a), (b) or (c).

4. The turf surface of claim 1, wherein the reinforcing fibres are secured to the reinforcing root-permeable mat by at least one of tufting, knitting and weaving.

5. The turf surface of claim 1, wherein the reinforcing root-permeable mat comprises at least one non-biodegradable material.

6. The turf surface of claim 1, wherein the reinforcing root-permeable mat comprises at least one biodegradable material.

7. The turf surface of claim 1, wherein the root-permeable mat comprises a layer of biodegradable material and a layer of non-biodegradable material.

* * * * *

UNITED STATES PATENT AND TRADEMARK OFFICE
CERTIFICATE OF CORRECTION

PATENT NO. : 11,807,996 B2  
APPLICATION NO. : 14/119378  
DATED : November 7, 2023  
INVENTOR(S) : Hamish Ross Sutherland et al.

Page 1 of 1

It is certified that error appears in the above-identified patent and that said Letters Patent is hereby corrected as shown below:

On the Title Page

Column 1, item (71) "Applicant" is missing. The applicant is --Technology Licensing Corp. Newtown, OH. (US)--.

In the Claims

Column 12, Line 22-24, Claim 3 reads "... (b) biodegradable synthetic grass fibres made of polylactic acid, potyhydroxyaalkanoate, bioethylene and mixtures thereof; ...", should read --... (b) biodegradable synthetic grass fibres made of polylactic acid, polyhydroxyaalkanoate, bioethylene and mixtures thereof; ...--.

Signed and Sealed this  
Second Day of December, 2025

John A. Squires  
*Director of the United States Patent and Trademark Office*